United States Patent [19]
Evered et al.

[11] 3,716,120
[45] Feb. 13, 1973

[54] LIQUID PRESSURE LOCKING DEVICES FOR VARIABLE LENGTH STRUT MEMBERS

[75] Inventors: Kenneth Evered; Eric Meredith, both of Leamington Spa, England

[73] Assignee: Automotive Products Company Limited, Leamington Spa, England

[22] Filed: Dec. 7, 1970

[21] Appl. No.: 97,464

[30] Foreign Application Priority Data

Dec. 8, 1969 Great Britain.....................59,810/69

[52] U.S. Cl.................188/300, 248/354 H, 297/355
[51] Int. Cl. ...............................................F16f 9/16
[58] Field of Search ....188/300; 248/354 H; 297/355

[56] References Cited

UNITED STATES PATENTS

| | | | |
|---|---|---|---|
| 3,380,561 | 4/1968 | Porter | 188/300 |
| 3,407,909 | 10/1968 | Seckerson et al. | 188/300 |
| 3,528,532 | 9/1970 | Moskow | 188/300 |
| 2,658,588 | 11/1953 | Kanuch | 188/300 |

Primary Examiner—Evon C. Blunk
Assistant Examiner—Bruce H. Stoner, Jr.
Attorney—Lawrence J. Winter

[57] ABSTRACT

A variable length strut member adapted particularly for use with aircraft seats and comprising an inner cylinder member and a plunger slidable within a bore in the inner cylinder member. The inner cylinder member is slidably engaged within an outer cylinder member so as to define a first chamber therebetween. A compression spring urges the two cylinder members apart so that the volume of the first chamber is increased. A second chamber is defined within the bore of the inner cylinder member and is bounded by the plunger. A non-return valve controls liquid flow between the two chambers, the valve comprising a ball spring loaded on a valve seat so as to prevent liquid flow between the two chambers and thus lock the strut member against change in length. The plunger carries a pin projection which is arranged to hold the ball off the valve seat to allow change of length of the strut member. The arrangement is such that the load of the compression spring is transmitted to the plunger component of the strut member through the liquid in the two chambers. Preferably the cross-sectional area of the first chamber is substantially equal to the cross-sectional area of the plunger.

4 Claims, 2 Drawing Figures

PATENTED FEB 13 1973
3,716,120
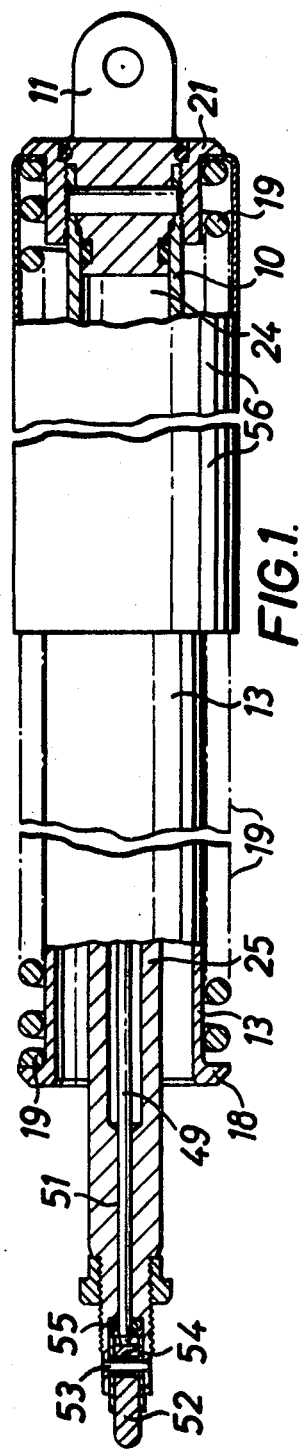
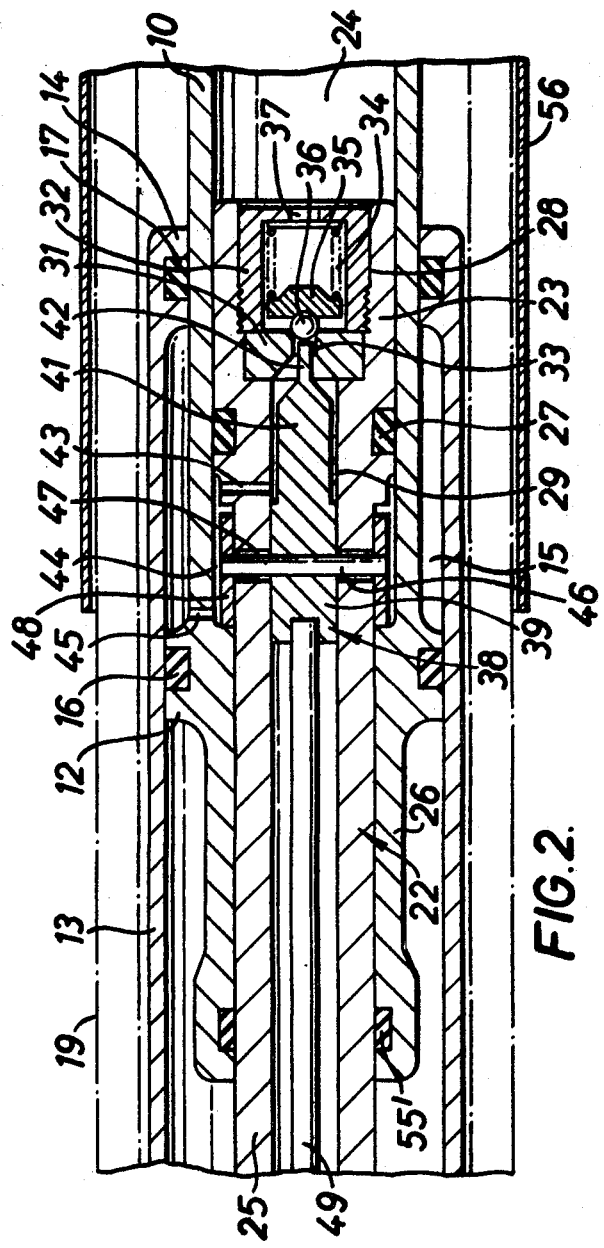
INVENTOR
Kenneth Evered
Eric Meredith
BY Lawrence
ATTORNEY

LIQUID PRESSURE LOCKING DEVICES FOR VARIABLE LENGTH STRUT MEMBERS

This invention relates to liquid pressure locking devices for variable length strut members, the term 'variable length strut members' being understood as including stiff elongated members of variable length which, when set to any given length, are releasably locked against change of length in at least one direction.

Such variable length strut members are commonly used, in association with springs, to control the inclination of the backs of seats for aircraft, the springs tending to urge the seat backs to an upright position and the locking means providing positive resistance to rearward tilting movement of the seat backs, whilst also providing sufficient resistance to the spring action to hold the seat backs against movement by the springs towards the upright position. The struts may also be used in a similar manner in seats for vehicles, such as motor coaches, and for purposes other than the control of the angular position of seat backs.

It is the object of the present invention to provide an improved locking device for a variable length strut member which is relatively simple in construction and satisfactory in use.

According to the present invention, there is provided a variable length strut member including spring means providing a force tending to change the length of the strut in one direction and releasable locking means providing positive locking of the strut member against change of length in the opposite direction, the locking means comprising a valve controlling the flow of liquid between first and second liquid chambers the volumes of which vary in opposite senses with changes of length of the strut member, wherein the load of the spring means is transmitted to the strut member through the liquid in said chambers.

Preferably, the valve is a spring-loaded non-return valve which, when closed, prevents flow of liquid between the first and second chambers resulting from change of length of the strut member in said opposite direction, the spring loading of the non-return valve being sufficient to prevent flow of liquid between said chambers due to the force of the spring means tending to change the length of the strut in said one direction.

According to one embodiment of the present invention, a variable length strut member comprises telescoping inner and outer cylinder members, spring means acting between said cylinder members to urge them axially one relative to the other, annular wall members on said cylinder members to define a first annular liquid chamber between said cylinder members which decreases in length with relaxation of the spring means, a plunger slidable in said inner cylinder member to define therewith a second liquid chamber, passage means connecting the first and second liquid chambers, a non-return valve normally preventing flow of liquid from the second chamber to the first chamber and providing a predetermined resistance to flow of liquid from said first chamber to said second chamber, and means for unseating the said non-return valve to permit free flow of liquid in either direction, the inner cylinder member and the plunger being adapted for connection respectively to components the relative movement and position of which are to be controlled by the strut member.

Preferably, the cross-sectional area of the first liquid chamber is equal, or substantially equal, to the cross-sectional area of the plunger stem, so that a given relative movement of the plunger relative to the inner cylinder member is accompanied by a substantially equal movement of the outer cylinder member relative to the inner cylinder member.

The spring means may comprise a compression spring acting to urge the cylinder members axially outwardly one relative to the other, the plunger being held against axially inward movement relative to the inner cylinder member by liquid trapped in the second liquid chamber.

One embodiment of the invention, particularly adapted for use in connection with aircraft seats, will now be described by way of example, with reference to the accompanying drawing, in which:

FIG. 1 is an elevation, partly in section and with parts broken away, of the described embodiment of the strut; and FIG. 2 is a sectional elevation, on a larger scale, of the central part of the strut shown in FIG. 1.

The strut comprises an inner cylinder member 10 closed at one end and provided at that end with means such as an apertured lug 11 for attaching it to, for example, an arm fixed to a pivotally mounted seat back and extending below the pivot thereof. At its other end, the cylinder member 10 is formed with an external circumferential rib 12, and an outer cylinder member 13, the inner wall surface of which is slidably engaged with the rib 12, has an internal thickened portion 14 at one end, slidably engaging the external surface of the cylinder member 10, to define, with the rib 12, an annular liquid chamber 15 between the two cylinders, hereinafter referred to as the first liquid chamber. Sealing rings 16 and 17 mounted in the rib 12 and in the thickened portion 14 respectively render the first liquid chamber 15 liquid-tight.

An external flange 18 is provided at the other end of the outer cylinder member 13, and a coiled compression spring 19, surrounding the two cylinder members, extends between the flange 18 and an external flange 21 at the closed end of the inner cylinder member 10, the spring 19 acting to urge the two cylinder members axially outwardly one relative to the other and so to reduce the volume of the first liquid chamber 15.

A plunger 22, slidable in the inner cylinder member 10, includes a head 23 engaging the inner wall surface of the said member 10 and defining, between itself and the closed end of the said inner cylinder member 10 a second liquid chamber 24. A stem 25 of the plunger 22, of a diameter somewhat less than that of the head 23, extends outwardly through a guide 26 formed by an extension of the inner cylinder member 10, and through the outer cylinder member 13, the stem 25 being adapted, at its end which projects from the cylinder member 13, for attachment to a seat with which the strut member is associated.

The plunger head 23 carries a sealing ring 27 to provide a fluid-tight sliding joint with the interior wall of the inner cylinder member 10, and, in the end of the plunger head facing the second liquid chamber 24, there is formed a co-axial cavity 28 from which a co-axial bore 29 extends through the plunger. A disc 31 retained in the inner end of the cavity 28 by a cup-shaped screw plug 32 has a central aperture 33 in which is seated, by a spring 34 acting through a disc member 35 and reacting on the end wall of the plug 32, a valve ball 36. The said end wall of the plug 32 is centrally apertured at 37.

In the bore 29 of the plunger 22 there is mounted a valve control plunger 38 having an end portion 39 which is a close sliding fit in the bore 29, an intermediate portion 41 of reduced diameter providing clearance between itself and the said bore, and a pin portion 42 adapted to enter, with clearance, the aperture 33 in the disc 31 and push the ball 36 off its seat.

The clearance space around the intermediate portion 41 of the valve control plunger is connected by radial passages 43 in the plunger 22 to an annular clearance space 44 between the plunger stem 25 and the bore of the inner cylinder member 10, which clearance space is in turn connected by radial passages 45 in the inner cylinder member to the first liquid chamber 15. A diametral pin 46 passes through a radial hole in the end portion 39 of the said valve control plunger and through clearance holes 47 in the plunger 22. Limited movement of the valve control plunger 38 relative to the plunger 22 is permitted by the clearance holes 47. The outer ends of the diametral pin 46 engage in holes in a sleeve 48 surrounding the plunger stem 25 in the clearance space 44. The end wall of the clearance space 44 defined by the guide extension 26 is arranged to engage the sleeve 48 just before the strut is extended fully so that the pin portion 42 holds the ball 36 off its seat when the strut is extended fully.

The valve control plunger 38 is actuated by a rod 49 extending through the bore 29 of the plunger 22, which bore, at its end remote from the plunger head, is reduced in diameter at 51 to provide a guide for the rod 49. The rod 49, at its end remote from the valve control plunger 38, is acted upon by a push button 52 mounted in a recess in the end of the plunger stem 25 and having its movement limited by a diametral pin 53 fitting closely in holes in the plunger stem and passing through a clearance hole 54 in the push button 52. A sealing ring 55 in the inner end of the recess housing the push button 52 prevents leakage of liquid along the bore 29.

A sealing ring 55₁ mounted in the guide 26 prevents leakage of liquid between the said guide and the plunger stem 25.

The cross-sectional area of the first liquid chamber 15 is preferably equal to the cross-sectional area of the plunger stem 25. A shroud 56 is provided to enclose partially the spring 19.

Assuming that the strut is mounted, as hereinbefore described, between an aircraft seat and the pivotally mounted back of said seat, it will be apparent that the spring 19 will tend to displace liquid from the first liquid chamber 15 into the second liquid chamber 24, moving the plunger 22 outwardly with respect to the inner cylinder member 10 to extend the strut and urge the seat back towards an upright position, the spring force being transmitted to the plunger through the liquid. When the valve ball 36 is seated, the spring 34 offers sufficient resistance to unseating thereof to prevent movement of the seat back by the spring 19 alone, although it may be moved if additional force is applied to the said back.

When the valve ball 36 is seated, however, liquid is trapped in the second liquid chamber 24, and rearward tilting of the seat back is positively prevented. By unseating the valve ball 36, which is effected by pressing the push button 52, the liquid lock is released, and the seat back can be tilted rearwardly to any desired angle, displacing liquid from the second liquid chamber 24 into the first chamber 15 to compress the spring 19, the seat back being locked in any desired position by releasing the push button 52 to allow the valve ball 36 to seat. Moreover, when the ball 36 is unseated at a time when the seat back is inclined rearwardly, the spring 19, acting to displace liquid from the first liquid chamber 15 into the second liquid chamber 24, can move the seat back towards the upright position.

Any change in volume of the liquid in the strut, due to the temperature changes, is compensated by extension or shortening of the spring 19, the first liquid chamber 15 serving as an expansion chamber.

Since the cross-sectional area of the first liquid chamber 15 is substantially equal to the cross-sectional area of the plunger stem 25, and the cross-sectional area of the second liquid chamber 24 is equal to the sum of the cross-sectional areas of the plunger stem 25 and the clearance space 44, the sum of the cross-sectional areas of the first liquid chamber 15 and the clearance space 44 is substantially equal to the cross-sectional area of the second liquid chamber 24. Consequently, the outer cylinder member 13 will move substantially the same distance as the plunger 22 whenever the strut extends or contracts. It is not essential that these areas should be substantially equal, since if they are substantially different, this will merely result in a movement of the outer cylinder member 13 which is substantially different from the associated movement of the plunger 22.

However, the provision of first and second liquid chambers 15 and 24, and a clearance space 44 having cross-sectional areas bearing the relation above described is preferred as being the most convenient arrangement.

We claim:

1. A variable length strut member comprising an outer cylinder, an inner cylinder telescopically slidable in said outer cylinder, said cylinder defining between them a first liquid chamber which is annular and which decreases in length with outward movement of said inner cylinder in said outer cylinder, a plunger in said inner cylinder movable relative to both said cylinders and defining with said inner cylinder a second liquid chamber which increases in length with outward movement of said plunger into said inner cylinder, passage means connecting said first liquid chamber and said second liquid chamber, spring means acting between said inner and outer cylinders to urge the inner cylinder axially outwardly of the outer cylinder and exert a force tending to urge fluid from said first liquid chamber through said passage means into said second liquid chamber to extend the strut, a valve in said passage means including a valve member urged towards a seat by fluid pressure in the second liquid chamber and by a valve spring strong enough to resist pressure exerted on the fluid by said spring means, and manual valve operating means to unseat said valve closure member.

2. A variable length strut member according to claim 1, wherein the plunger comprises a head and a stem of smaller diameter than said head, a reduced diameter portion of said inner cylinder being provided in which said stem is slidable, said inner cylinder and stem thereby defining an annular space forming part of said passage means.

3. A variable length strut member according to claim 2 wherein the manual valve operating means comprise a valve control rod slidable in an axial bore in the plunger, an external push button for moving said rod to unseat the valve closure member, a sleeve in said annular space forming part of the passage means, a diametral pin connecting said rod to said sleeve and passing through clearance holes in said plunger stem and an abutment for said sleeve on said inner cylinder member whereby said sleeve and rod are displaced when the strut member is fully extended to unseat said valve closure member.

4. A variable length strut member according to claim 2, wherein the cross-sectional area of the first liquid chamber is substantially equal to the cross-sectional area of the plunger stem, so that a given relative movement of the plunger relative to the inner cylinder member is accompanied by a substantially equal movement of the outer cylinder member relative to the inner cylinder member.

* * * * *